US011662117B2

(12) United States Patent
Murakami et al.

(10) Patent No.: US 11,662,117 B2
(45) Date of Patent: May 30, 2023

(54) FAN CONTROL APPARATUS AND FAN CONTROL METHOD

(71) Applicant: SANYO DENKI CO., LTD., Tokyo (JP)

(72) Inventors: Naoki Murakami, Tokyo (JP); Honami Osawa, Tokyo (JP); Souma Araki, Tokyo (JP); Masashi Murakami, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 375 days.

(21) Appl. No.: 16/518,628

(22) Filed: Jul. 22, 2019

(65) Prior Publication Data

US 2020/0041161 A1 Feb. 6, 2020

(30) Foreign Application Priority Data

Jul. 31, 2018 (JP) ............................ JP2018-144536

(51) Int. Cl.
*F24F 11/77* (2018.01)
*F24F 110/20* (2018.01)
(Continued)

(52) U.S. Cl.
CPC ........... *F24F 11/77* (2018.01); *F24F 2110/10* (2018.01); *F24F 2110/20* (2018.01); *F24F 2110/40* (2018.01)

(58) Field of Classification Search
CPC .... F24F 11/77; F24F 2110/10; F24F 2110/20; F24F 2110/40
(Continued)

(56) References Cited

U.S. PATENT DOCUMENTS 6,450,414 B1 9/2002 Dartnall
8,087,980 B2 1/2012 Palmer
(Continued)

FOREIGN PATENT DOCUMENTS

JP S6062540 A 4/1985
JP H1061987 A 3/1998
(Continued)

OTHER PUBLICATIONS

Extended European Search Report (EESR) dated Feb. 24, 2020 issued in the corresponding European Patent Application No. 19187445.2.

(Continued)

*Primary Examiner* — Allen R. B. Schult
(74) *Attorney, Agent, or Firm* — Rankin, Hill & Clark LLP

(57) ABSTRACT

Provided is a fan control apparatus which includes: a first sensor; a second sensor; an RF fan; and a controller. The first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, the RF fan is placed at a boundary between the first and second rooms, and the controller is configured to control a rotational speed and rotational direction of the RF fan in such a manner that the measured values of the first and second sensors are the same.

3 Claims, 13 Drawing Sheets

CONTROLLER
CONTROL SIGNAL
ROTATION SIGNAL
SG1
SG2
X
1
A
B
ROOM
ROOM
3
AR1
AR2
5
7
PRESSURE SENSOR A
PRESSURE SENSOR B

(51) Int. Cl.
*F24F 110/10* (2018.01)
*F24F 110/40* (2018.01)

(58) Field of Classification Search
USPC .......................................................... 454/255
See application file for complete search history.

(56) References Cited

U.S. PATENT DOCUMENTS

2006/0099904 A1* 5/2006 Belt ......................... F24F 11/62 454/236
2007/0184775 A1* 8/2007 Perkins ................... F24F 7/025 454/273
2008/0307803 A1* 12/2008 Herzon .................... F24F 11/77 62/93
2010/0323604 A1* 12/2010 Duffe ...................... F24F 7/065 454/258
2015/0105009 A1 4/2015 Alshinnawi et al.
2016/0054046 A1* 2/2016 Sim ....................... F25D 17/047 454/340
2017/0146254 A1* 5/2017 Gheyri ..................... F24F 11/77
2017/0254555 A1* 9/2017 Tae .................... G05D 23/1951
2018/0216843 A1* 8/2018 Zhou ........................ F24F 11/54

FOREIGN PATENT DOCUMENTS

JP 2012222048 A 11/2012
JP 2016109408 A 6/2016
JP 2017194242 A 10/2017
WO 00/17583 A1 3/2000
WO 2014/140205 A1 9/2014
WO 2015/171051 A2 11/2015
WO 2017/020889 A2 2/2017

OTHER PUBLICATIONS

Office Action (JPOA) dated Mar. 22, 2022 for the corresponding JP Patent Application No. 2018-144536.

* cited by examiner

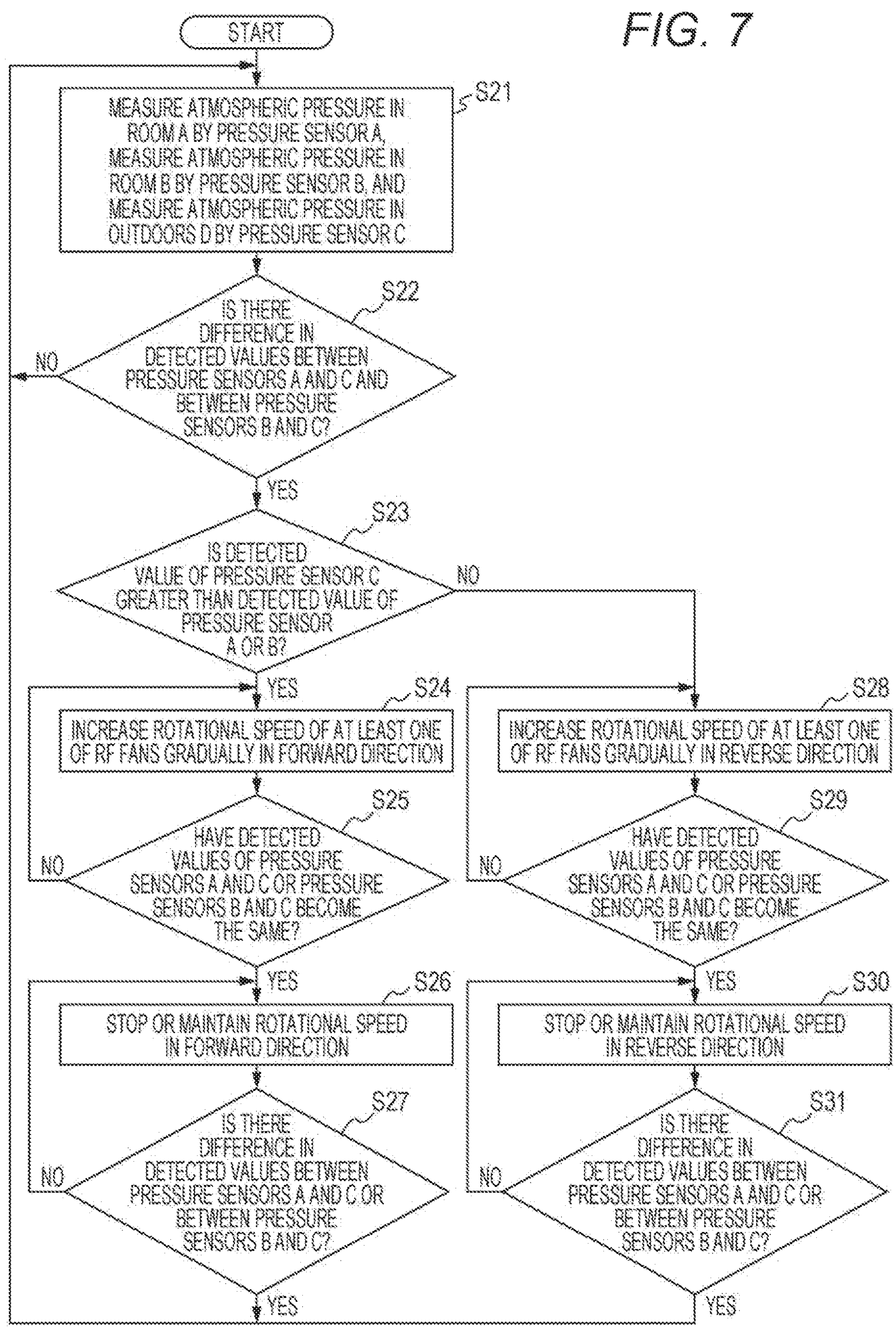
FIG. 7
START
S21
MEASURE ATMOSPHERIC PRESSURE IN ROOM A BY PRESSURE SENSOR A, MEASURE ATMOSPHERIC PRESSURE IN ROOM B BY PRESSURE SENSOR B, AND MEASURE ATMOSPHERIC PRESSURE IN OUTDOORS D BY PRESSURE SENSOR C
S22
IS THERE DIFFERENCE IN DETECTED VALUES BETWEEN PRESSURE SENSORS A AND C AND BETWEEN PRESSURE SENSORS B AND C?
NO
YES
S23
IS DETECTED VALUE OF PRESSURE SENSOR C GREATER THAN DETECTED VALUE OF PRESSURE SENSOR A OR B?
NO
YES
S24
INCREASE ROTATIONAL SPEED OF AT LEAST ONE OF RF FANS GRADUALLY IN FORWARD DIRECTION
S25
HAVE DETECTED VALUES OF PRESSURE SENSORS A AND C OR PRESSURE SENSORS B AND C BECOME THE SAME?
NO
YES
S26
STOP OR MAINTAIN ROTATIONAL SPEED IN FORWARD DIRECTION
S27
IS THERE DIFFERENCE IN DETECTED VALUES BETWEEN PRESSURE SENSORS A AND C OR BETWEEN PRESSURE SENSORS B AND C?
NO
YES
S28
INCREASE ROTATIONAL SPEED OF AT LEAST ONE OF RF FANS GRADUALLY IN REVERSE DIRECTION
S29
HAVE DETECTED VALUES OF PRESSURE SENSORS A AND C OR PRESSURE SENSORS B AND C BECOME THE SAME?
NO
YES
S30
STOP OR MAINTAIN ROTATIONAL SPEED IN REVERSE DIRECTION
S31
IS THERE DIFFERENCE IN DETECTED VALUES BETWEEN PRESSURE SENSORS A AND C OR BETWEEN PRESSURE SENSORS B AND C?
NO
YES W
B
ROOM
7
PRESSURE SENSOR B
AR2
3
SG1
CONTROL SIGNAL
ROTATION SIGNAL
SG2
AR1
5
PRESSURE SENSOR A
1
CONTROLLER
ROOM
A
NT
INTERNET
11

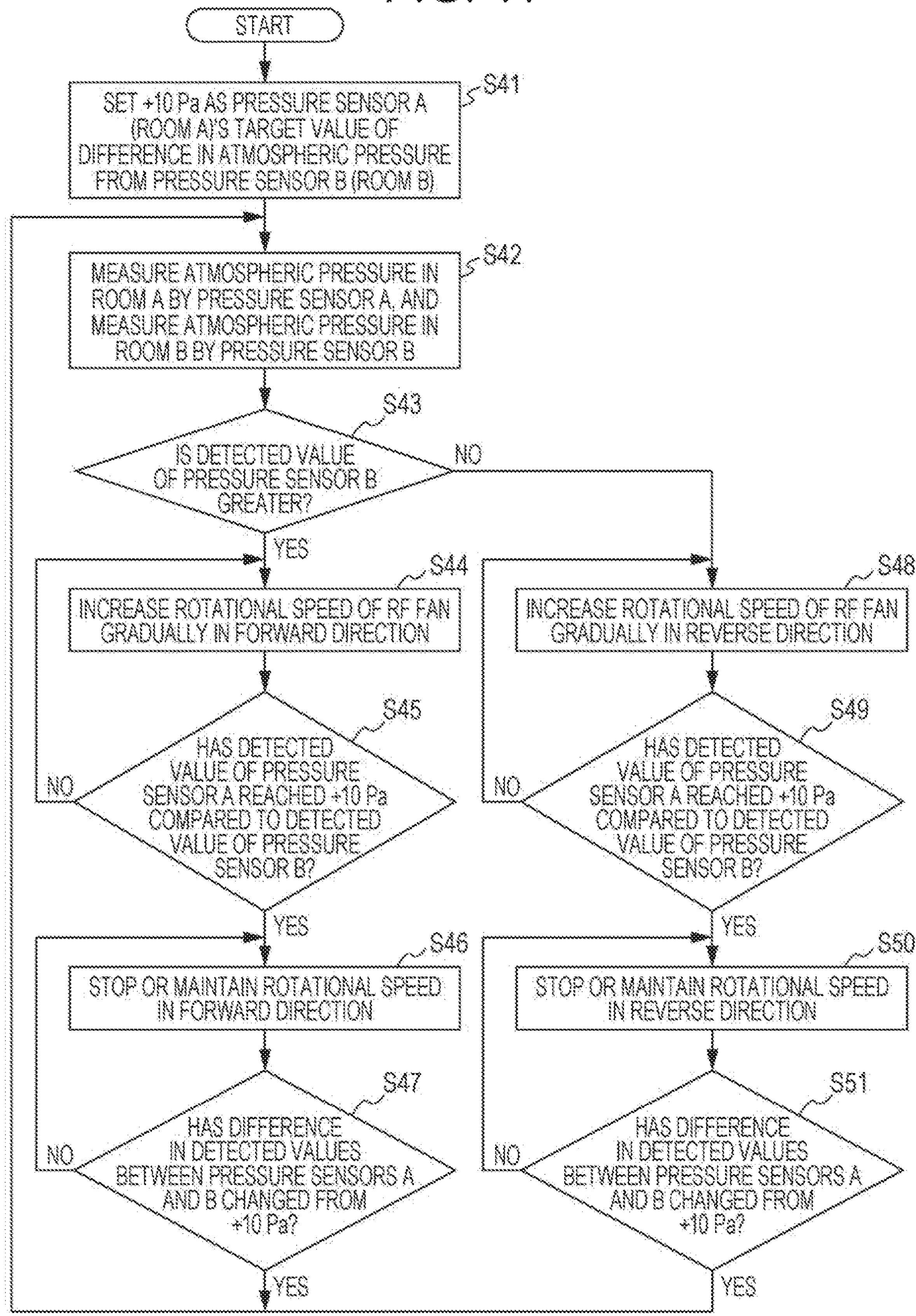
FIG. 11
START
SET +10 Pa AS PRESSURE SENSOR A (ROOM A)'S TARGET VALUE OF DIFFERENCE IN ATMOSPHERIC PRESSURE FROM PRESSURE SENSOR B (ROOM B)
S41
MEASURE ATMOSPHERIC PRESSURE IN ROOM A BY PRESSURE SENSOR A, AND MEASURE ATMOSPHERIC PRESSURE IN ROOM B BY PRESSURE SENSOR B
S42
IS DETECTED VALUE OF PRESSURE SENSOR B GREATER?
S43
NO
YES
INCREASE ROTATIONAL SPEED OF RF FAN GRADUALLY IN FORWARD DIRECTION
S44
INCREASE ROTATIONAL SPEED OF RF FAN GRADUALLY IN REVERSE DIRECTION
S48
HAS DETECTED VALUE OF PRESSURE SENSOR A REACHED +10 Pa COMPARED TO DETECTED VALUE OF PRESSURE SENSOR B?
S45
NO
YES
HAS DETECTED VALUE OF PRESSURE SENSOR A REACHED +10 Pa COMPARED TO DETECTED VALUE OF PRESSURE SENSOR B?
S49
NO
YES
STOP OR MAINTAIN ROTATIONAL SPEED IN FORWARD DIRECTION
S46
STOP OR MAINTAIN ROTATIONAL SPEED IN REVERSE DIRECTION
S50
HAS DIFFERENCE IN DETECTED VALUES BETWEEN PRESSURE SENSORS A AND B CHANGED FROM +10 Pa?
S47
NO
YES
HAS DIFFERENCE IN DETECTED VALUES BETWEEN PRESSURE SENSORS A AND B CHANGED FROM +10 Pa?
S51
NO
YES

FAN CONTROL APPARATUS AND FAN CONTROL METHOD

CROSS-REFERENCE TO RELATED APPLICATION

This application claims priority from Japanese Patent Application No. 2018-144536 filed with the Japan Patent Office on Jul. 31, 2018, the entire content of which is hereby incorporated by reference.

BACKGROUND

1. Technical Field

The present disclosure relates to fan control and a fan control method.

2. Related Art

An automatic RF fan control technology using a sensor is well known as a cooling technology using a fan (refer to, for example, JP-A-2012-222048).

SUMMARY

A fan control apparatus according to an embodiment of the present disclosure includes: a first sensor; a second sensor; an RF fan; and a controller. The first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, the RF fan is placed at a boundary between the first and second rooms, and the controller is configured to control a rotational speed and rotational direction of the RF fan in such a manner that the measured values of the first and second sensors are the same.

BRIEF DESCRIPTION OF THE DRAWINGS

FIG. 7 is a flowchart diagram illustrating the flow of control of RF fans by a controller of the fan control apparatus according to the second embodiment of the present disclosure;

FIG. 11 is a flowchart diagram illustrating the flow of control of the RF fan by a controller of the fan control apparatus according to the third embodiment of the present disclosure;

DETAILED DESCRIPTION

Figure 1:
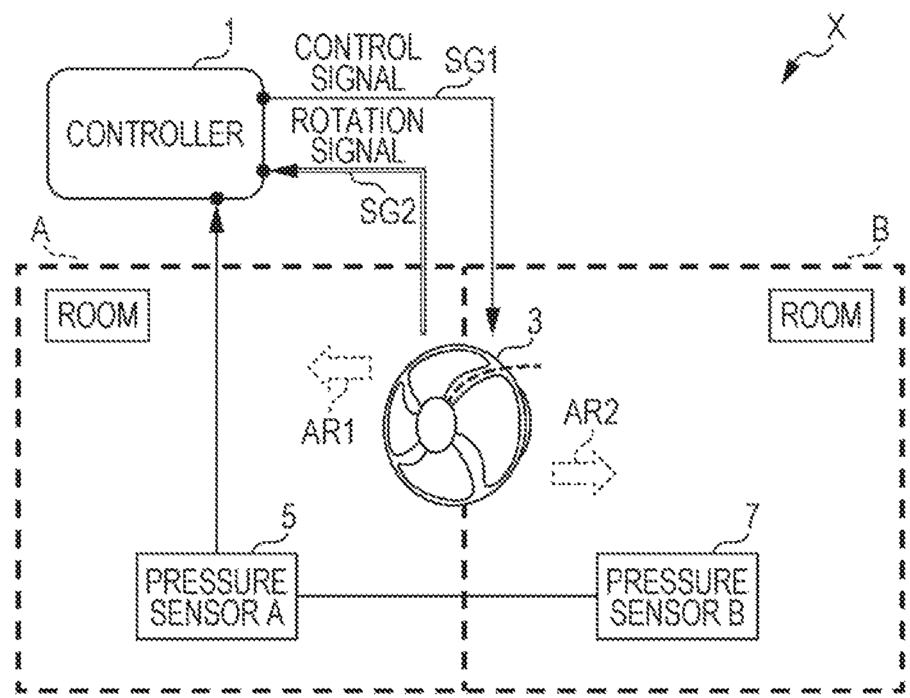
FIG. 1 is a diagram illustrating an example of the configuration of a fan control apparatus according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 15:
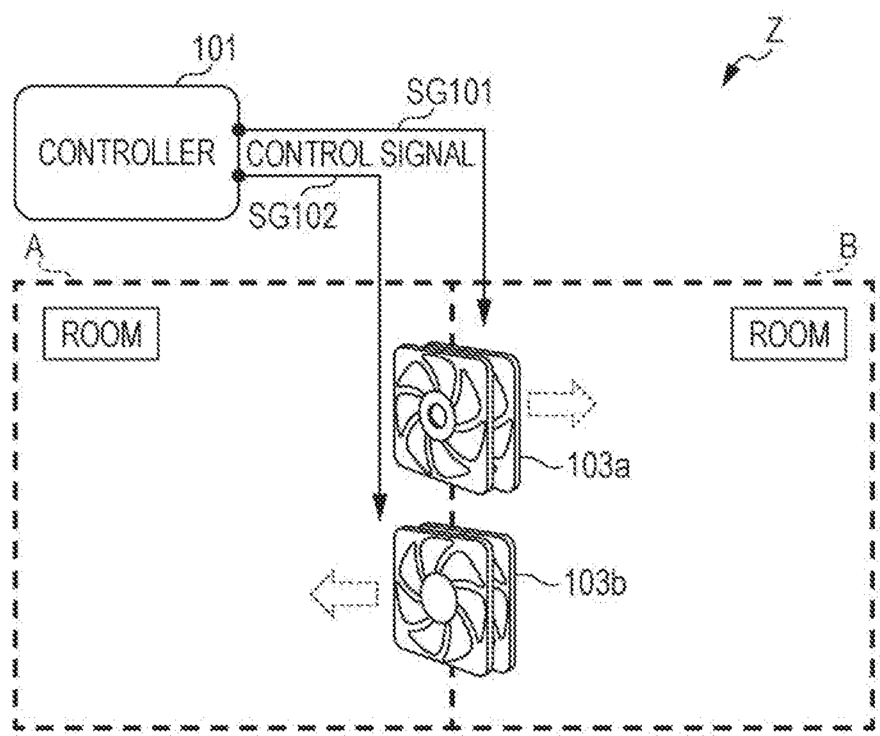
FIG. 15 is a diagram illustrating an example of the configuration of a standard fan control apparatus.

FIG. 15 illustrates an example of the configuration of a standard fan control apparatus.

In order to adjust the atmospheric pressures, temperatures, or the like in a plurality of adjacent rooms A and B to be equal, using standard fans, it is necessary to place two fans 103*a* and 103*b* for air inlet and outlet between the rooms A and B, as illustrated in FIG. 15.

In other words, as in a system Z illustrated in FIG. 15, a control signal SG101 from a controller 101 to the fan 103*a* and a control signal SG102 from the controller 101 to the fan 103*b* enable driving the fans 103*a* and 103*b* alternately, which makes it possible to make the pressures and temperatures of the two rooms uniform.

However, in the above configuration, the pressure, temperature, humidity, or the like of the room cannot be controlled unless a sensor for detecting the state of the room and the fan work together.

An object of the present disclosure is to control the pressure, temperature, and humidity in adjacent rooms with a simpler configuration.

According to an aspect of the present disclosure, provided is a fan control apparatus which includes: a first sensor; a second sensor; an RF fan; and a controller. The first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, the RF fan is placed at a boundary between the first and second rooms, and the controller is configured to control a rotational speed and rotational direction of the RF fan in such a manner that the measured values of the first and second sensors are the same.

Further, according to another aspect of the present disclosure, provided is a fan control apparatus which includes: a first sensor; a second sensor; a third sensor; a first RF fan; a second RF fan; and a controller. The first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, the third sensor is configured to acquire a measured value of the same condition as the at least one selected condition on an exterior outside of the first and second rooms, the first RF fan is placed at a boundary between the first room and the outside of the room, the second RF fan is placed at a boundary between the second room and the outside of the room, and the controller is configured to control a rotational speed and rotational direction of the first RF fan in such a manner that the measured values of the first and third sensors are the same, and control a rotational speed and rotational direction of the second RF fan in such a manner that the measured values of the second and third sensors are the same.

Further, according to still another aspect of the present disclosure, provided is a fan control method which includes: using a fan control apparatus; and controlling a rotational speed and rotational direction of an RF fan in such a manner that measured values of a first and a second sensor are the same. The fan control apparatus includes the first sensor, the second sensor, and the RF fan, the first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, and the RF fan is placed at a boundary between the first and second rooms.

Further, according to still another aspect of the present disclosure, provided is a fan control method which includes: using a fan control apparatus; controlling a rotational speed and rotational direction of a first RF fan in such a manner that measured values of a first and a third sensor are the same; and controlling a rotational speed and rotational direction of a second RF fan in such a manner that a measured value of a second sensor and the measured value of the third sensor are the same. The fan control apparatus includes the first sensor, the second sensor, the third sensor, the first RF fan, and the second RF fan, the first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of the same condition as the at least one selected condition for the second room, the third sensor is configured to acquire a measured value of the same condition as the at least one selected condition on an exterior outside of the first and second rooms, the first RF fan is placed at a boundary between the first room and the outside of the room, and the second RF fan is placed at a boundary between the second room and the outside of the room.

When the above technology is used, the fan may be controlled in such a manner that a difference between measured values of adjacent rooms is a predetermined value. Alternatively, if there are RF fans provided respectively at boundaries between three or more adjacent rooms, the fans may be controlled in such a manner that a measured value of each room is the same as a predetermined set value.

According to embodiments of the present disclosure, it is possible to control the pressure, temperature, and humidity in adjacent rooms with a fan control apparatus having a simple configuration.

A reversible flow (RF) fan indicates a fan that can switch the wind direction by itself (hereinafter referred to as an RF fan).

The RF fan serves as both an inlet fan and an outlet fan. Accordingly, the room atmospheric pressure, temperature, or humidity can be adjusted by one RF fan. As described below, a plurality of sensors and the RF fan, which are used, are controlled. Consequently, various types of automatic control become possible.

First Embodiment

Firstly, a first embodiment of the present disclosure is described in detail with reference to the drawings.

FIG. 1 illustrates an example of the configuration of a fan control apparatus according to the embodiment.

As illustrated in FIG. 1, a fan control apparatus X according to the embodiment controls an RF fan 3 placed (at the boundary) between, for example, a first room such as a room A and a second room adjacent to the first room, such as a room B. The RF fan 3 can switch the direction of airflow between the room A side (AR1) and the room B side (AR2). Pressure sensors A5 and B7 are placed in the rooms A and B, respectively. A measured pressure value acquired by each pressure sensor is inputted into a controller 1. Moreover, an RF fan control signal SG1 and an RF fan rotation signal SG2 are exchanged between the controller 1 and the RF fan 3. In this example, the pressure sensor A5 measures the atmospheric pressure in the room A. The pressure sensor B7 measures the atmospheric pressure in the room B. The RF fan 3 is controlled automatically in such a manner that the atmospheric pressures in the two rooms are the same.

Figure 2:
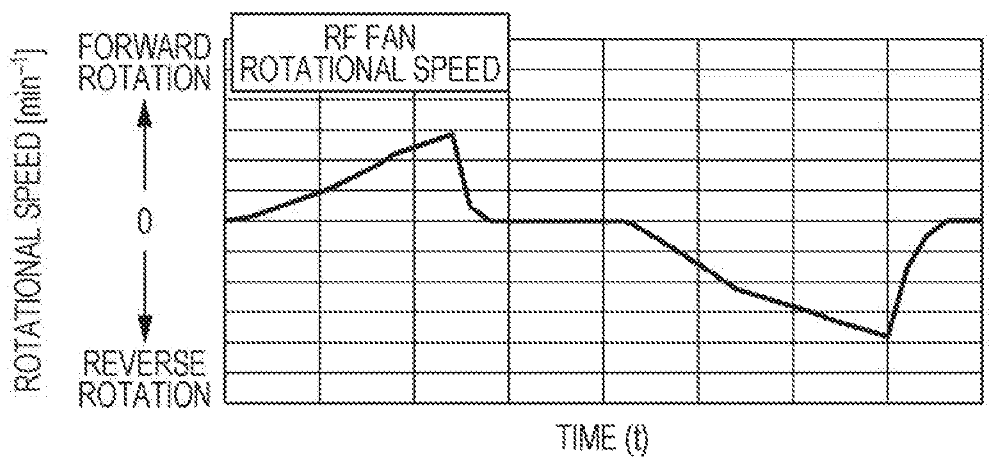
FIG. 2 is a diagram illustrating an example of changes over time in the forward and reverse rotational speed of an RF fan in fan control.

FIG. 2 illustrates an example of changes over time in the forward and reverse rotational speed of the RF fan. FIG. 2 illustrates a state where the rotational speed and rotational direction of the RF fan 3 are adjusted in such a manner that the rooms A and B are at the same atmospheric pressure when there arises a difference in atmospheric pressure between the two rooms. The rotational direction of the RF fan 3 is reversed when the rotational speed=0.

Figure 3:
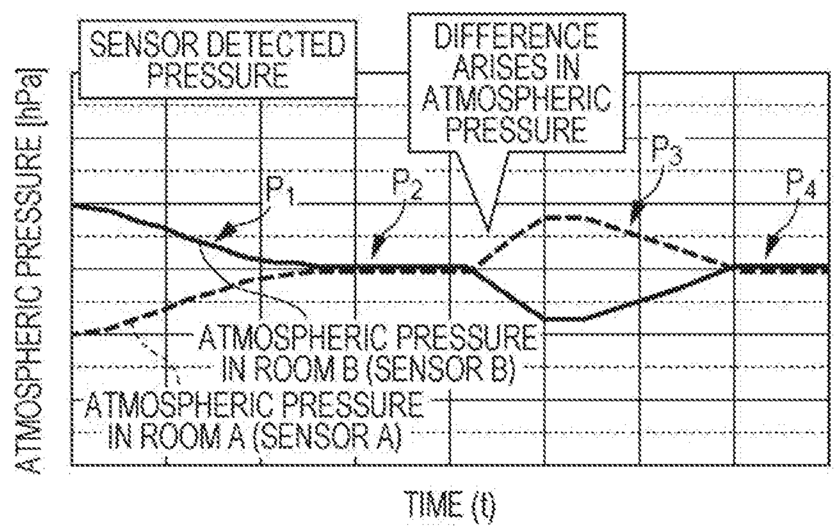
FIG. 3 is a diagram illustrating changes over time in the atmospheric pressures (hPa) measured by a pressure sensor A placed in a room A and a pressure sensor B placed in a room B.

FIG. 3 illustrates changes over time in the atmospheric pressures (hPa) measured by the pressure sensor A5 placed in the room A and the pressure sensor B7 placed in the room B. As illustrated in FIG. 3, even if there arises a difference in atmospheric pressure between the rooms A and B (for example, P1 and P3), the rotational speed of the RF fan 3 is adjusted in such a manner that the atmospheric pressures in the rooms A and B are the same (for example, P2 and P4). In other words, the controller 1 controls the rotational speed and rotational direction of the RF fan 3 in such a manner as to reduce a difference in atmospheric pressure between the rooms when the difference arises.

Figure 4:
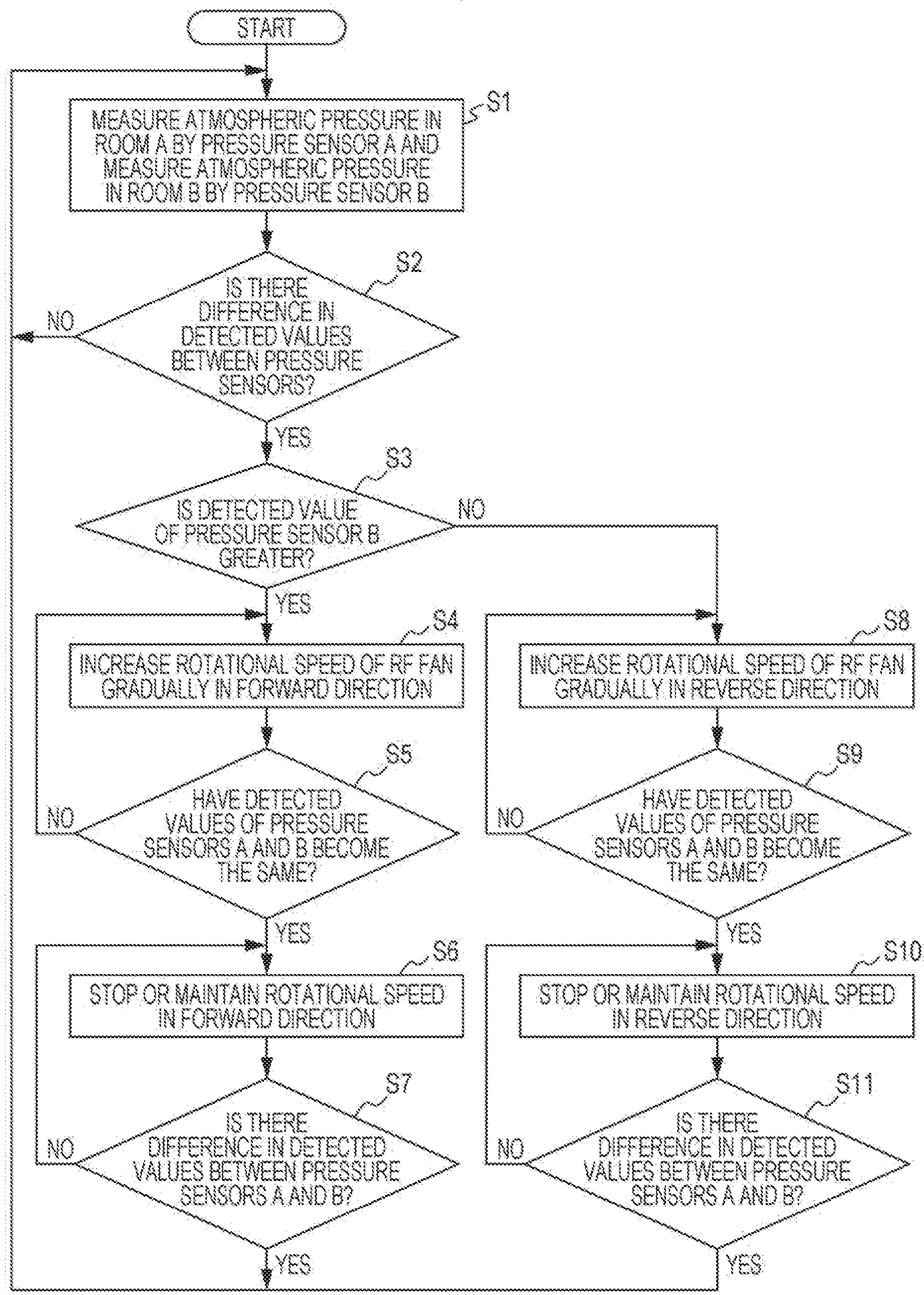
FIG. 4 is a flowchart diagram illustrating the flow of control of the RF fan by a controller of the fan control apparatus according to the first embodiment of the present disclosure.

FIG. 4 is a flowchart diagram illustrating the flow of control of the RF fan 3 by the controller 1 of the fan control apparatus according to the first embodiment of the present disclosure.

In step S1, the process starts (Start). The pressure sensor A5 measures the atmospheric pressure in the room A. The pressure sensor B7 measures the atmospheric pressure in the room B.

In step S2, it is determined whether or not there is a difference in detected value between the pressure sensors A5 and B7. If there is no difference in detected value between the pressure sensors A5 and B7 (for example, the difference is less than a certain threshold) (NO), the control returns to step S1. If there is a difference in detected value between the pressure sensors A5 and B7 (for example, the difference is greater than the certain threshold) (YES), the control proceeds to step S3. In step S3, it is determined whether or not the detected value of the pressure sensor B7 is greater than the detected value of the pressure sensor A5.

If the determination of step S3 is YES, the control proceeds to step S4. The rotational speed of the RF fan 3 increases gradually in the forward direction (a direction of airflow from the room B to the room A).

Next, the control proceeds to step S5. The control does not proceed further until the detected values of the pressure sensors A5 and B7 become the same.

If the detected values of the pressure sensors A5 and B7 have become the same (the determination of step S5 is YES), the control proceeds to step S6. The rotational speed of the RF fan 3 in the forward direction is maintained. Alternatively, the RF fan 3 may stop. Next, in step S7, it is determined whether or not there is a difference in detected value between the pressure sensors A5 and B7. If the determination of step S7 is NO, the control returns to step S6. If the determination of step S7 is YES, the control returns to step S1.

On the other hand, if the determination of step S3 is NO, the control proceeds to step S8. The rotational direction of the RF fan 3 is reversed. The rotational speed thereof increases gradually.

Next, the control proceeds to step S9. The control does not proceed further until the detected values of the pressure sensors A5 and B7 become the same. If the detected values of the pressure sensors A5 and B7 have become the same, the control proceeds to step S10. The RF fan 3 stops, or maintains the rotational speed of the RF fan 3 in the reverse direction. Next, in step S11, it is determined whether or not there is a difference in detected value between the pressure sensors A5 and B7. If the determination of step S11 is No, the control returns to step S10. If the determination of step S11 is YES, the control returns to step S1.

With the above process, the RF fan 3 is controlled automatically to maintain the states of the two rooms A and B in such a manner that the atmospheric pressures in the two rooms are the same, as illustrated in FIGS. 2 and 3.

FIG. 1 illustrates the example where the pressure sensors perform sensing. However, it is also possible for the automatic control to adjust the temperatures with temperature sensors. Furthermore, it is also possible to adjust the humidities with humidity sensors.

In other words, in a case of control with the temperature sensors, the RF fan 3 is controlled in such a manner that the temperatures in the two rooms are the same. In a case of control with the humidity sensors, the RF fan 3 is controlled in such a manner that the humidities in the two rooms are the same.

Second Embodiment

Next, a second embodiment of the present disclosure is described in detail with reference to the drawings.

Figure 5:
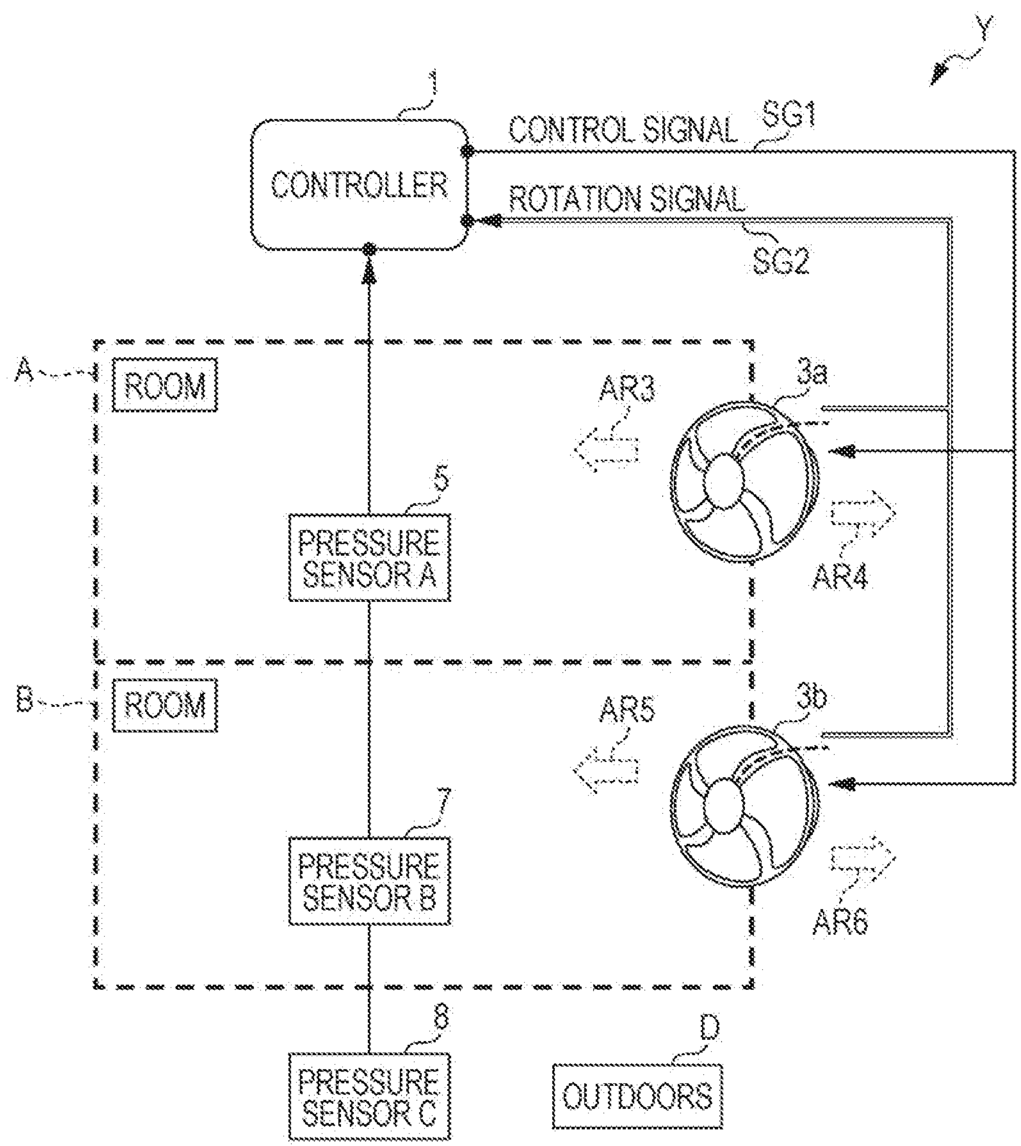
FIG. 5 is a diagram illustrating an example of the configuration of a fan control apparatus according to a second embodiment of the present disclosure.

FIG. 5 illustrates an example of the configuration of a fan control apparatus according to the embodiment.

As illustrated in FIG. 5, a fan control apparatus Y according to the embodiment controls a space including, for example, a first room such as a room A, a second room adjacent to the first room, such as a room B. and an outside of the rooms such as the outdoors D. A first RF fan A3*a* is placed between the room A and the outdoors D. The first RF fan A3*a* can switch the direction of airflow between the room A side (AR3) and the outdoors D side (AR4). Furthermore, a second RF fan B3*b* is placed between the room B and the outdoors D. The second RF fan B3*b* can switch the direction of airflow between the room B side (AR5) and the outdoors D side (AR6).

Pressure sensors A5, B7, and C8 are placed in the rooms A and B, and the outdoors D (near the rooms A and B), respectively. Each measured pressure value is inputted into a controller 1. Moreover, a control signal SG1 and a rotation signal SG2 are exchanged independently between the controller 1 and the first and second RF fans A3*a* and B3*b*. The pressure sensor A5 measures the atmospheric pressure in the room A. The pressure sensor B7 measures the atmospheric pressure in the room B. The RF fans 3*a* and 3*b* are controlled automatically in such a manner that the two rooms are at the same atmospheric pressure as the outdoors D.

Figure 6:
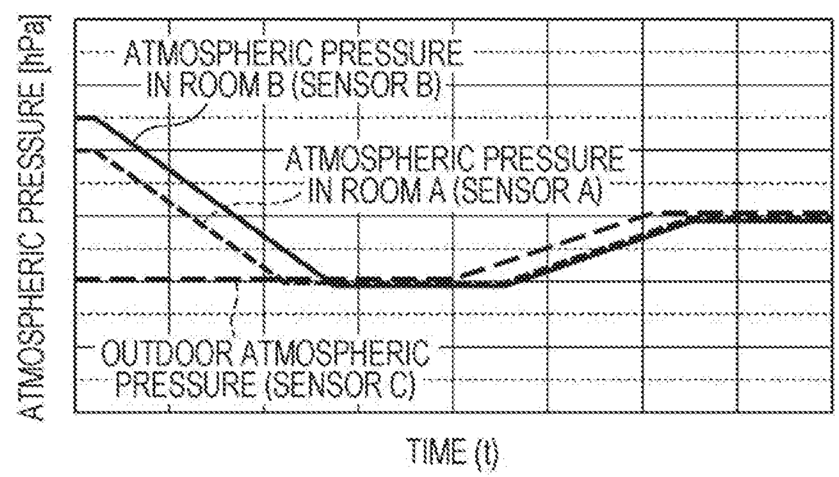
FIG. 6 is a diagram illustrating changes over time in the atmospheric pressures (hPa) measured by a pressure sensor A placed in a room A and a pressure sensor B placed in a room B in fan control.

FIG. 6 illustrates changes over time in the atmospheric pressures (hPa) measured by the pressure sensor A5 placed in the room A, the pressure sensor B7 placed in the room B, and the pressure sensor C8 placed in the outdoors D. As illustrated in FIG. 6, the rotational speeds of the RF fans A3*a* and B3*b* are adjusted in such a manner that the atmospheric pressures in the rooms A and B are the same as the atmospheric pressure in the outdoors D. In other words, the rotational speeds and rotational directions of the RF fans A3*a* and B3*b* are controlled in such a manner as to reduce a difference in atmospheric pressure if the difference arises. Consequently, the rotational speeds of the RF fans A3*a* and B3*b* are adjusted in such a manner that the atmospheric pressures in the rooms A and B follow the atmospheric pressure in the outdoors D.

FIG. 7 is a flowchart diagram illustrating the flow of control of the RF fans 3 by the controller 1 of the fan control apparatus according to the second embodiment of the present disclosure.

In step S21, the process starts (Start). The pressure sensor A5 measures the atmospheric pressure in the room A. The pressure sensor B7 measures the atmospheric pressure in the room B. The pressure sensor C8 measures the atmospheric pressure in the outdoors D.

In step S22, it is determined whether or not there is a difference in detected value between the pressure sensors A5 and C8. Furthermore, it is also determined whether or not there is a difference in detected value between the pressure sensors B7 and C8. If there is no difference in detected values between the pressure sensors A5 and CS and between the pressure sensors B7 and C8 (the difference is less than a certain threshold) (NO), the control returns to step S21. If there is a difference in detected value between the pressure sensors A5 and C8 or between the pressure sensors B7 and C8 (the difference is greater than the certain threshold) (YES), the control proceeds to step S23. It is determined whether or not the detected value of the pressure sensor C8 is greater than the detected value of the pressure sensor A5 or B7.

If the determination of step S23 is YES, the control proceeds to step S24. The rotational speed of at least one of the RF fans A3*a* and B3*b* in the forward direction (a direction of airflow from the outdoors D to the room A or B) increases gradually.

Next, the control proceeds to step S25. The control does not proceed further until the detected values of the pressure sensors A5 and C8 become the same, or until the detected values of the pressure sensors B7 and C8 become the same.

If the detected values of the pressure sensors A5 and C8, or the detected values of the pressure sensors B7 and C8, have become the same (the determination of step S25 is YES), the control proceeds to step S26. The RF fan A3*a* or B3*b* stops, or maintains the rotational speed in the forward direction. In step S27, it is determined whether or not there is a difference in detected value between the pressure sensors A5 and C8 or between the pressure sensors B7 and C8. If the determination of step S27 is NO, the control returns to step S26. If the determination of step S27 is YES, the control returns to step S21.

On the other hand, if the determination of step S23 is NO, the control proceeds to step S28. The rotational direction of at least one of the RF fans A3*a* and B3*b* is reversed. The rotational speed thereof then increases gradually.

Next, the control proceeds to step S29. The control does not proceed further until the detected values of the pressure sensors A5 and C8, or the detected values of the pressure sensors B7 and C8, become the same. If the detected values of the pressure sensors A5 and CS, or the detected values of the pressure sensors B7 and C8, have become the same (the determination of step S29 is YES), the control proceeds to step S30. The RF fan A3*a* or B3*b* stops, or maintains the rotational speed in the reverse direction. Next, in step S31, it is determined whether or not there is a difference in detected value between the pressure sensors A5 and CS or between the pressure sensors B7 and C8. If the determination of step S31 is No, the control returns to step S30. If the determination of step S31 is YES, the control returns to step S21.

With the above process, the RF fans A3*a* and B3*b* are controlled automatically to maintain the state where the two rooms A and B and the outdoors D are at the same atmospheric pressure, as illustrated in FIGS. 5 and 6. FIG. 6 illustrates the example where the pressure sensors perform sensing. However, it is also possible for the automatic control to measure the temperatures with temperature sensors and adjust the temperatures. Furthermore, it is also possible to measure the humidities with humidity sensors and adjust the humidities.

For example, if the RF fans are controlled with the temperature sensors, the RF fans are controlled in such a manner that the temperatures in the rooms and the outdoor temperature are the same. If the RF fans are controlled with the humidity sensors, the RF fans are controlled in such a manner that the humidities in the rooms and the outdoor humidity are the same.

Third Embodiment

Next, a third embodiment of the present disclosure is described in detail with reference to the drawings.

Figure 8:
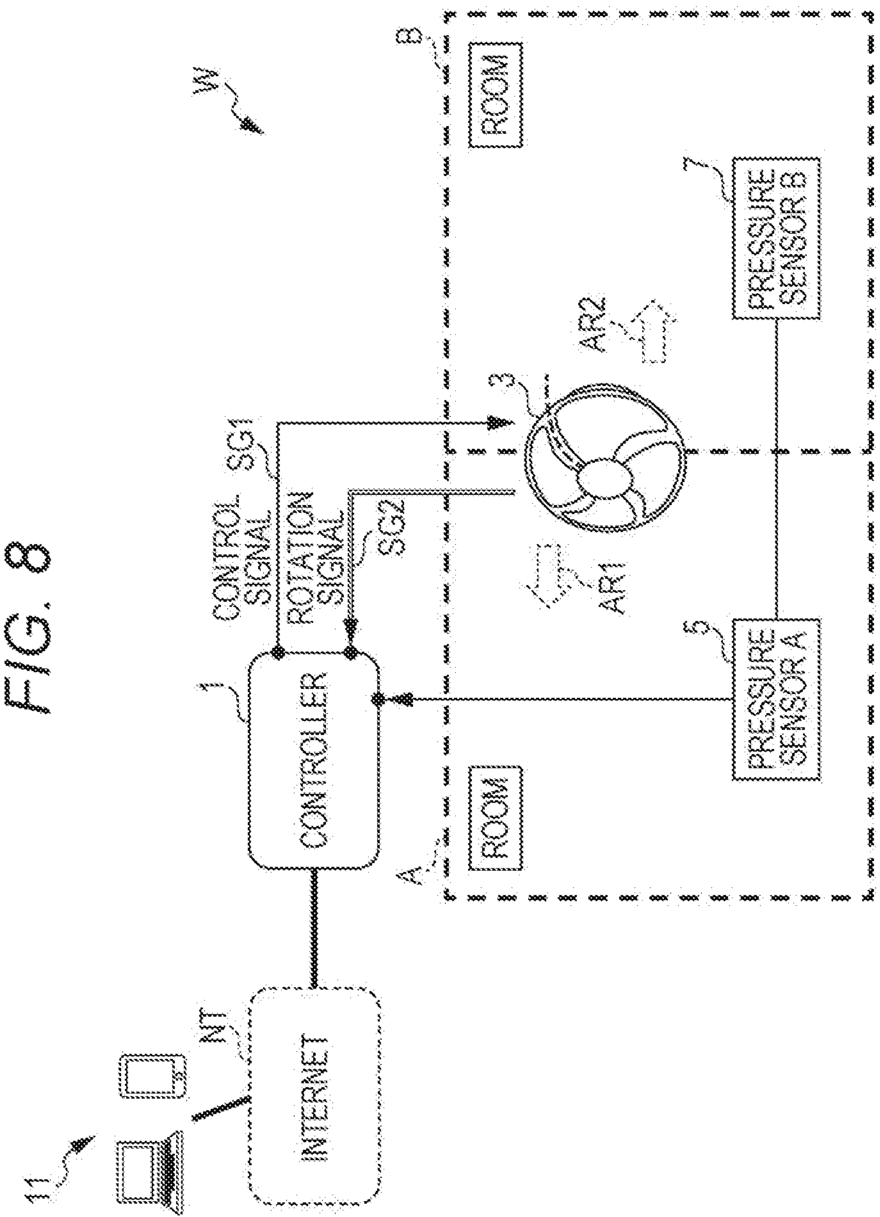
FIG. 8 is diagram illustrating an example of the configuration of a fan control apparatus according to a third embodiment of the present disclosure.

FIG. 8 illustrates an example of the configuration of a fan control apparatus according to the embodiment.

As illustrated in FIG. 8, a fan control apparatus W according to the embodiment basically has a configuration similar to the first embodiment. However, in the embodiment, the pressure sensor A5 measures the atmospheric pressure in the room A. The pressure sensor B7 measures the atmospheric pressure in the room B. The controller 1 controls the RF fan 3 in such a manner as to cause a predetermined atmospheric pressure difference between the two rooms. For example, the RF fan A3 is controlled automatically in such a manner as to increase the detected value of the pressure sensor A5 by 10 Pa compared to the detected value of the pressure sensor B7 in this example.

As illustrated by example in FIG. 8, the fan control apparatus of the embodiment may be configured in such a manner that a control signal of the controller 1 and sensing signals of the sensors A5 and B7 can be controlled remotely via the Internet (network) NT with reference to the rotational speed of the RF fan 3, using, for example, a terminal 11 such as a smartphone or personal computer. This configuration can also be applied to any of the first embodiment to a fourth embodiment.

Figure 9:
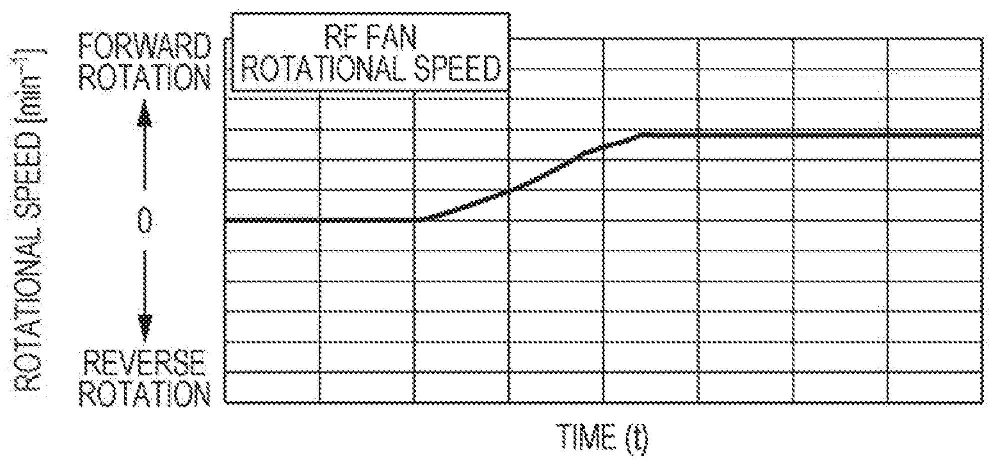
FIG. 9 is a diagram illustrating an example of changes over time in the forward and reverse rotational speed of an RF fan.

FIG. 9 illustrates an example of changes over time in the forward and reverse rotational speed of the RF fan. FIG. 9 illustrates a state where the rotational speed and rotational direction of the RF fan 3 are adjusted in such a manner that a difference in atmospheric pressure between the rooms A and B is, for example, 10 Pa.

Figure 10:
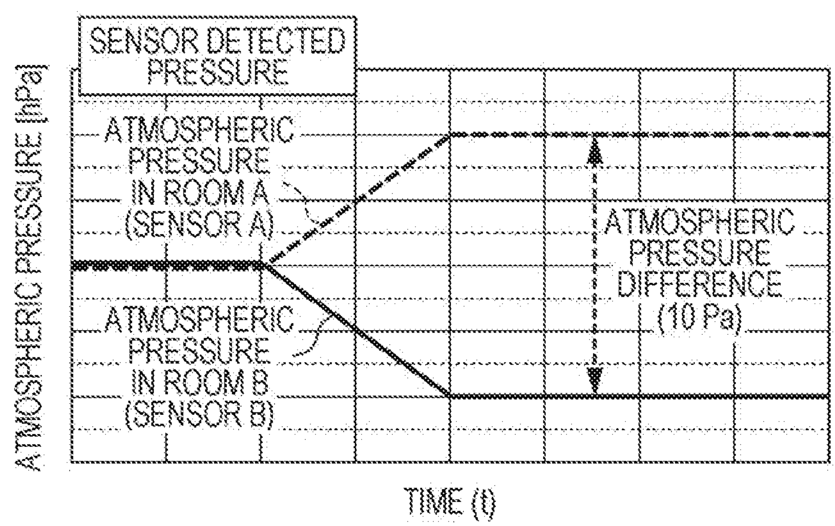
FIG. 10 is a diagram illustrating changes over time in the atmospheric pressures (hPa) measured by a pressure sensor A placed in a room A and a pressure sensor B placed in a room B.

FIG. 10 illustrates changes over time in the atmospheric pressures (Pa) measured by the pressure sensor A5 placed in the room A and the pressure sensor B7 placed in the room B. As illustrated in the passage of time in FIG. 10, the atmospheric pressures in the rooms A and B are the same for a certain period. The rotational speed of the RF fan 3 is subsequently adjusted in such a manner as to cause a difference of, for example, 10 Pa in atmospheric pressure between the rooms A and B. In other words, the controller 1 controls the rotational speed and rotational direction of the RF fan A3 in such a manner that there is a predetermined difference in atmospheric pressure between the rooms. At this point in time, in the example illustrated in FIG. 10, the RF fan A3 is controlled in such a manner as to increase the atmospheric pressure in the room A and decrease the atmospheric pressure in the room B.

FIG. 11 is a flowchart diagram illustrating the flow of control of the RF fan A3 by the controller 1 according to the third embodiment of the present disclosure. In Step S41, the process starts (Start). The pressure sensor A (the room A) 5's target value of a difference in atmospheric pressure from the pressure sensor B (the room B) 7 is set at, for example, +10 Pa in the controller 1.

In step S42, the pressure sensor A5 measures the atmospheric pressure in the room A. The pressure sensor B7 measures the atmospheric pressure in the room B.

In step S43, it is determined whether or not the detected value of the pressure sensor B7 is greater than the detected value of the pressure sensor A5.

If the determination is YES, the control proceeds to step S44. If the determination is No, the control proceeds to step S48.

In step S44, the rotational speed of the RF fan A3 increases gradually in the forward direction. Next, the control proceeds to step S45. It is determined whether or not the detected value of the pressure sensor A5 has reached+10 Pa compared to the detected value of the pressure sensor B7.

If the determination of step S45 is YES, the control proceeds to step S46. If the determination of step S45 is No, the control returns to step S44.

In step S46, the RF fan A3 stops, or maintains the rotational speed in the forward direction. In step S47, it is determined whether or not the difference in detected value between the pressure sensors A5 and B7 has changed from +10 Pa. If the determination is Yes here, the control returns to step S42. If the determination is No, the control returns to step S46.

On the other hand, if the control proceeds to step S48, the rotational speed of the RF fan A3 increases gradually in the reverse direction. In step S49, it is then determined whether or not the detected value of the pressure sensor A5 has reached+10 Pa compared to the detected value of the pressure sensor B7. If the determination is Yes here, the control proceeds to step S50. The RF fan A3 stops, or maintains the rotational speed in the reverse direction. If the determination is No here, the control returns to step S48.

Next, the control proceeds from step S50 to step S51. It continues to be determined whether or not the difference in detected value between the pressure sensors A5 and B7 has changed from +10 Pa. If the determination is Yes, the control returns to step S42. If the determination is No, the control returns to step S50.

With the above process, the RF fan A3 is controlled automatically to maintain the states of the two rooms A and B in such a manner as to maintain a predetermined pressure difference in atmospheric pressure between the two rooms, as illustrated in FIGS. 9 and 10.

FIG. 8 illustrates the example where the pressure sensors perform sensing. However, it is also possible for the automatic control to adjust the temperatures with temperature sensors. Furthermore, it is also possible adjust the humidities with humidity sensors.

In other words, in a case of control with the temperature sensors, the RF fan 3 is controlled in such a manner that a difference in temperature between the two rooms is a predetermined value. In a case of control with the humidity sensors, the RF fan 3 is controlled in such a manner that a difference in humidity between the two rooms is a predetermined value.

Fourth Embodiment

Next, a fourth embodiment of the present disclosure is described in detail with reference to the drawings.

Figure 12:
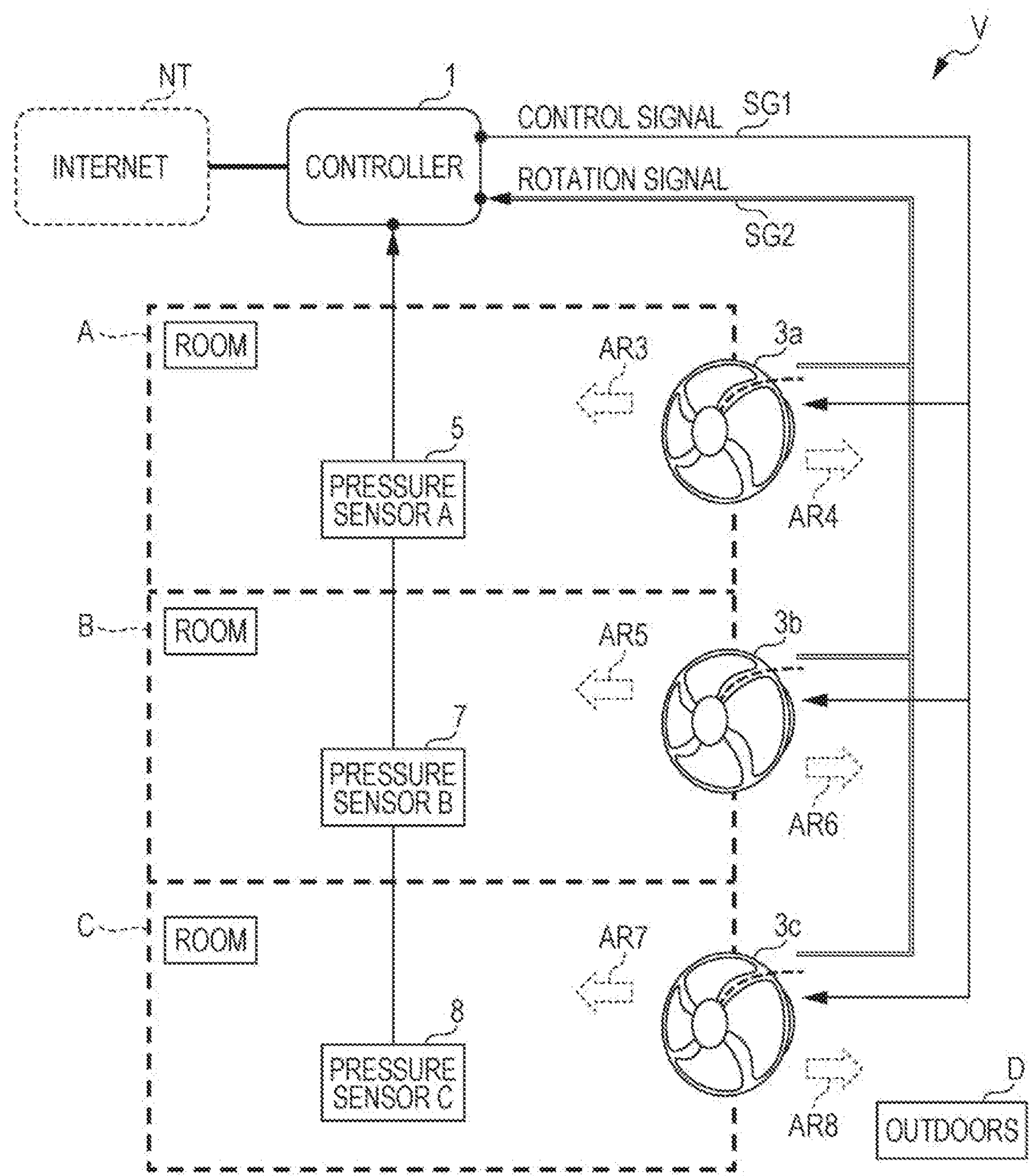
FIG. 12 is a diagram illustrating an example of the configuration of a fan control apparatus according to a fourth embodiment of the present disclosure.

FIG. 12 illustrates an example of the configuration of a fan control apparatus according to the embodiment.

As illustrated in FIG. 12, a fan control apparatus V according to the embodiment basically has a configuration similar to the second embodiment. Differences from the second embodiment (for example, FIG. 5) are as follows: three or more rooms including a room C in addition to the rooms A and B are placed in series; and the RF fan A3*a* is provided between the room A and the outdoors D, the RF fan B3*b* between the room B and the outdoors D. and an RF fan C3*c* between the room C and the outdoors D.

In addition, the controller 1 controls the RF fans automatically in such a manner as to bring the atmospheric pressures (or temperatures or humidities) of the plurality of rooms (the rooms A, B. C, . . . ) respectively to target values of the rooms.

Figure 13:
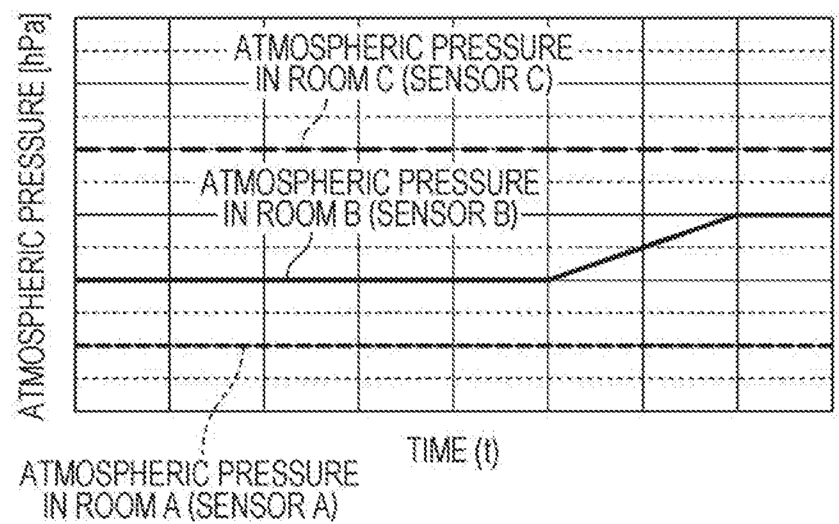
FIG. 13 is a diagram illustrating changes over time in the atmospheric pressures (hPa) measured by pressure sensors A to C placed respectively in rooms A to C.

FIG. 13 is a diagram illustrating changes over time in the atmospheric pressures (hPa) measured by the pressure sensors A to C placed respectively in the rooms A to C. FIG. 13 illustrates a state where the rotational speeds and rotational directions of the RF fans 3*a*, 3*b*, and 3*c* are adjusted in such a manner as to bring the atmospheric pressures in the rooms A. B, and C to predetermined target values. FIG. 13 illustrates an example where the RF fans 3*a*, 3*b*, and 3*c* are controlled in such a manner as to change only the target value of the room B without changing the atmospheric pressures in the rooms A and C. FIG. 13 illustrates a state where the RF fans are driven to change only the atmospheric pressure in the room B without changing the atmospheric pressures in the rooms A and C.

Figure 14:
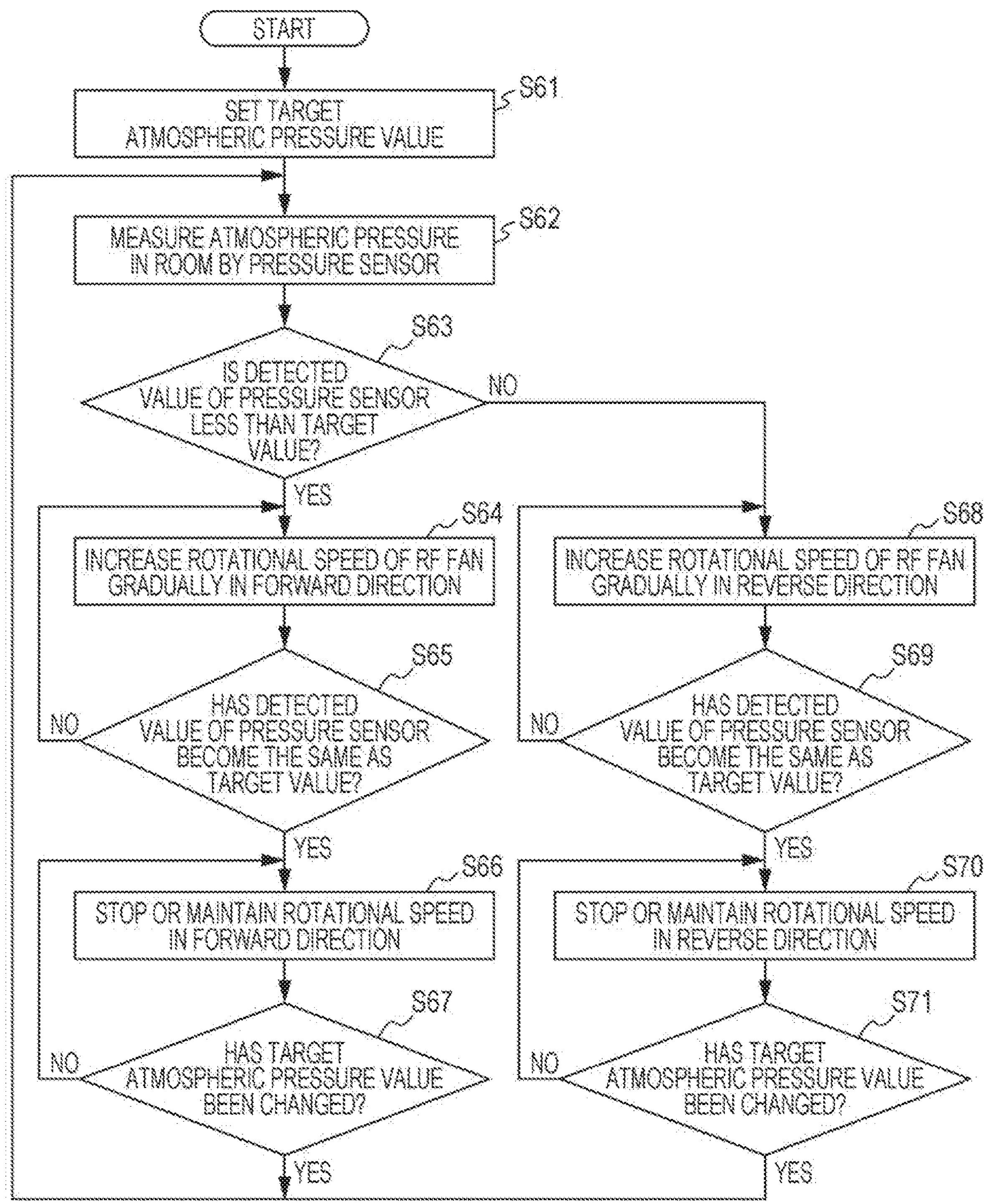
FIG. 14 is a flowchart diagram illustrating the flow of control of RF fans by a controller of the fan control apparatus according to the fourth embodiment of the present disclosure.

FIG. 14 is a flowchart diagram illustrating the flow of control of the RF fans A3*a*, B3*b*, and C3*c* by the controller 1 of the fan control apparatus in the embodiment. With a process illustrated in the following flowchart, the atmospheric pressure is adjusted on a room basis. Here, the atmospheric pressure does not change over time in the rooms A and C. A description is given of an example where the RF fans 3*a*, 3*b*, and 3*c* are controlled in such a manner as to bring the atmospheric pressure in the room B to a target value.

In step S61, the process starts (Start). A target atmospheric pressure value is set. In step S62, the atmospheric pressure in the room is measured by the pressure sensor. In other words, the controller 1 measures the atmospheric pressure in the room B using the pressure sensor B (the room B) 7.

In step S63, it is determined whether or not the detected value of the pressure sensor B7 is less than the target value. If the determination is Yes, the control proceeds to step S64. If the determination is No, the control proceeds to step S68.

In step S64, the rotational speed of the RF fan B3*b* increases gradually in the forward direction.

In step S65, it is determined whether or not the detected value of the pressure sensor B7 has become the same as the target value. If the determination is Yes, the control proceeds to step S66. If the determination is No, the control returns to step S64.

In step S66, the RF fan B3*b* stops, or maintains the rotational speed in the forward direction. In step S67, it is determined whether or not the target atmospheric pressure value has been changed. If the determination is Yes, the control returns to step S62. If the determination is No, the control returns to step S66.

In step S68, the rotational speed of the RF fan B3*b* increases gradually in the reverse direction. Next, in step S69, it is determined whether or not the detected value of the pressure sensor has become the same as the target value.

If the determination is Yes, the control proceeds to step S70. If the determination is No, the control returns to step S68. In step S70, the RF fan B3*b* stops, or maintains the rotational speed in the reverse direction. It is determined whether or not the target atmospheric pressure value has been changed in step S71. If the determination is Yes, the control returns to step S62. If the determination is No, the control returns to step S70.

With the above process, the RF fans 3*a*, 3*b*, and 3*c* are controlled automatically to maintain the states of the rooms A, B, and C in such a manner as to bring the atmospheric pressure in the room B to a predetermined set value, as illustrated in FIGS. 12 and 13. The process of FIG. 14 can be performed for each room to set different atmospheric pressures according to the rooms.

FIG. 14 illustrates the example where the pressure sensors perform sensing. However, it is also possible for the automatic control to adjust the temperatures with temperature sensors. Furthermore, it is also possible to adjust the humidities with humidity sensors.

In other words, in a case of control with the temperature sensors, the RF fans 3*a*, 3*b*, and 3*c* are controlled in such a manner as to bring the temperatures in the three rooms to predetermined values. In a case of control with the humidity sensors, the RF fans 3*a*, 3*b*, and 3*c* are controlled in such a manner as to bring the humidities in the three rooms to predetermined values.

The above embodiments are not limited to the illustrated configurations. The above embodiments can be modified as appropriate within the scope that exerts the effect of the present disclosure. In addition, the above embodiments can be modified as appropriate and carried out unless they depart from the scope of the object of the present disclosure.

Moreover, the components of the present disclosure can be freely selected. An embodiment including the selected configuration is also included in the embodiments.

Moreover, the process of each unit may be performed by causing a computer system to read and execute a program for realizing the functions described in the embodiments, the program being recorded in a computer-readable recording medium. The "computer system" here indicates a system including an OS and hardware such as a peripheral device.

Embodiments of the present disclosure can be used for a fan control apparatus.

A fan control apparatus according to embodiments of the present disclosure may be the following first to fourth fan control apparatuses:

The first fan control apparatus includes: a first sensor, provided in a first room, for acquiring a measured value of at least one selected from atmospheric pressure, temperature, and humidity; a second sensor, provided in a second room adjacent to the first room, for acquiring a measured value of the same type as the first sensor; an RF fan placed at a boundary between the first and second rooms; and a controller for controlling a rotational speed and rotational direction of the RF fan, in which the controller controls the rotational speed and rotational direction of the RF fan in such a manner that the measured values of the first and second sensors are the same.

The second fan control apparatus includes: a first sensor, provided in a first room, for acquiring a measured value of at least one selected from atmospheric pressure, temperature, and humidity; a second sensor, provided in a second room adjacent to the first room, for acquiring a measured value of the same type as the first sensor; a third sensor for acquiring a measured value of the same type as the first sensor on an exterior outside of the first and second rooms; a first RF fan placed at a boundary between the first room and the outside of the room; a second RF fan placed at a boundary between the second room and the outside of the room; and a controller for controlling rotational speeds and rotational directions of the first and second RF fans, in which the controller controls the rotational speed and rotational direction of the first RF fan in such a manner that the measured values of the first and third sensors are the same, and controls the rotational speed and rotational direction of the second RF fan in such a manner that the measured values of the second and third sensors are the same.

The third fan control apparatus includes: a first sensor, provided in a first room, for acquiring a measured value of at least one selected from atmospheric pressure, temperature, and humidity; a second sensor, provided in a second room adjacent to the first room, for acquiring a measured value of the same type as the first sensor; an RF fan placed at a boundary between the first and second rooms; and a controller for controlling a rotational speed and rotational direction of the RF fan, in which the controller controls the rotational speed and rotational direction of the RF fan in such a manner as to have a predetermined difference in the measured value between the first and second sensors.

The fourth fan control apparatus includes: a first sensor, provided in a first room, for acquiring a measured value of at least one selected from atmospheric pressure, temperature, and humidity; a second sensor, provided in a second room adjacent to the first room, for acquiring a measured value of the same type as the first sensor; a third sensor, provided in a third room adjacent to the second room, for acquiring a measured value of the same type as the first and second sensors; a first RF fan placed at a boundary between the first room and an exterior outside of the first room; a second RF fan placed at a boundary between the second room and an exterior outside of the second room; a third RF fan placed at a boundary between the third room and an exterior outside of the third room; and a controller for controlling rotational speeds and rotational directions of the first, second, and third RF fans, in which the controller controls the rotational speeds and rotational directions of the first, second, and third RF fans in such a manner that the measured value of at least one of the first, second, and third sensors is a predetermined value.

A fan control method according to embodiments of the present disclosure may be the following first to fourth fan control methods:

The first fan control method is a fan control method in a fan control apparatus having: a first sensor, provided in a first room, for acquiring a measured value of at least one selected from atmospheric pressure, temperature, and humidity; a second sensor, provided in a second room adjacent to the first room, for acquiring a measured value of the same type as the first sensor, and an RF fan placed at a boundary between the first and second rooms, the fan control method including a control step of controlling a rotational speed and rotational direction of the RF fan, in which the control step has the step of controlling the rotational speed and rotational direction of the RF fan in such a manner that the measured values of the first and second sensors are the same.

The second fan control method is a fan control method in a fan control apparatus having: a first sensor, provided in a first room, for acquiring a measured value of at least one selected from atmospheric pressure, temperature, and humidity; a second sensor, provided in a second room adjacent to the first room, for acquiring a measured value of the same type as the first sensor; a third sensor for acquiring a measured value of the same type as the first sensor on an exterior outside of the first and second rooms; a first RF fan placed at a boundary between the first room and the outside of the room; and a second RF fan placed at a boundary between the second room and the outside of the room, the fan control method including a control step of controlling rotational speeds and rotational directions of the first and second RF fans, in which the control step has controlling the rotational speed and rotational direction of the first RF fan in such a manner that the measured values of the first and third sensors are the same, and controlling the rotational speed and rotational direction of the second RF fan in such a manner that the measured values of the second and third sensors are the same.

The third fan control method is a fan control method in a fan control apparatus having: a first sensor, provided in a first room, for acquiring a measured value of at least one selected from atmospheric pressure, temperature, and humidity a second sensor, provided in a second room adjacent to the first room, for acquiring a measured value of the same type as the first sensor; and an RF fan placed at a boundary between the first and second rooms, the fan control method including a control step of controlling a rotational speed and rotational direction of the RF fan, in which the control step has controlling the rotational speed and rotational direction of the RF fan in such a manner as to have a predetermined difference in the measured value between the first and second sensors.

The fourth fan control method is a fan control method in a fan control apparatus having: a first sensor, provided in a first room, for acquiring a measured value of at least one selected from atmospheric pressure, temperature, and humidity; a second sensor, provided in a second room adjacent to the first room for acquiring a measured value of the same type as the first sensor; a third sensor, provided in a third room adjacent to the second room, for acquiring a measured value of the same type as the first and second sensors; a first RF fan placed at a boundary between the first room and an exterior outside of the first room; a second RF fan placed at a boundary between the second room and an exterior outside of the second room; and a third RF fan placed at a boundary between the third room and an exterior outside of the third room, the fan control method including a control step of controlling rotational speeds and rotational directions of the first, second, and third RF fans, in which the control step has controlling the rotational speeds and rotational directions of the first, second, and third RF fans in such a manner that the measured value of at least one of the first, second, and third sensors is a predetermined value.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

A, B, C Room
D Outdoors (outside of the room)
V, W, X, Y, Z Fan control apparatus
1 Controller (controller)
3 RF fan
5 Pressure sensor A
7 Pressure sensor B
8 Pressure sensor C

What is claimed is:

1. A fan control apparatus comprising:

a first sensor;

a second sensor;

an RF fan; and a controller, wherein the first sensor is provided in a first room, and is configured to acquire a measured value of atmospheric pressure for the first room, the second sensor is provided in a second room adjacent to the first room, and is configured to acquire a measured value of atmospheric pressure for the second room, the RF fan is placed at a boundary between the first and second rooms, the controller is configured to control a rotational speed and rotational direction of the RF fan in such a manner that the measured values of the first and second sensors are the same, the controller is configured to receive from the first and second sensors the measured value of the atmospheric pressure for the first room and the measured value of the atmospheric pressure for the second room and maintain the rotational speed and rotational direction of the RF fan when the measured values of the first and second sensors become the same, and the controller is configured to determine the measured value of the first sensor is different from the measured value of the second sensor, and increase the rotational speed of the RF fan gradually until the measured values of the first and second sensors become the same.

2. A fan control apparatus comprising:

a first sensor;

a second sensor;

an RF fan; and a controller, wherein the first sensor is provided in a first room, and is configured to acquire a measured value of at least one condition selected from conditions of atmospheric pressure, temperature, and humidity for the first room, the second sensor is provided in a second room adjacent to the first room, and is configured to acquire a measured value of a same condition as the at least one selected condition for the second room, the RF fan is placed at a boundary between the first and second rooms, the controller is configured to control a rotational speed and rotational direction of the RF fan in such a manner that the measured values of the first and second sensors are the same, the controller is configured to stop the RF fan from when the measured values of the first and second sensors become the same until when the measured values of the first and second sensors become different from each other, the controller is configured to start the RF fan when the measured values of the first and second sensors become different from each other, and the controller is configured to determine the measured value of the first sensor is different from the measured value of the second sensor, and increase the rotational speed of the RF fan gradually until the measured values of the first and second sensors become the same.

3. The fan control apparatus of claim 2, wherein the at least one condition is selected from the group consisting of atmospheric pressure and humidity for the first room.

* * * * *